United States Patent [19]

Smith et al.

[11] Patent Number: 4,731,996
[45] Date of Patent: Mar. 22, 1988

[54] POSITION TRANSMITTER FOR A PNEUMATIC-PNEUMATIC OR ELECTRO-PNEUMATIC CONVERTER

[75] Inventors: Jane E. Smith, Mentor; Raymond J. Sampson, Cleveland, both of Ohio

[73] Assignee: The Babcock & Wilcox Company, New Orleans, La.

[21] Appl. No.: 649,246

[22] Filed: Sep. 10, 1984

[51] Int. Cl.[4] .............................................. F16D 31/02
[52] U.S. Cl. .......................................... 60/390; 318/663
[58] Field of Search ................ 318/663; 60/388, 390, 60/391

[56] References Cited

U.S. PATENT DOCUMENTS

| | | | |
|---|---|---|---|
| 3,644,816 | 2/1972 | Gilbert | 318/663 |
| 4,031,442 | 6/1977 | Poppelreiter, II | 318/663 X |
| 4,417,312 | 11/1983 | Cronin et al. | 318/599 |
| 4,456,865 | 6/1984 | Robertson, Jr. et al. | 318/599 |
| 4,583,029 | 4/1986 | Robertson, Jr. et al. | 318/481 |

Primary Examiner—Edward K. Look
Attorney, Agent, or Firm—Robert J. Edwards; Vytas R. Matas

[57] ABSTRACT

A position transmitter which can be incorporated in a pneumatic-pneumatic or electro-pneumatic converter, and which readily provides for calibration between a zero position and a maximum position of a device to be actuated by the converter. The invention also provides a virtually non-interacting zero and span or full scale adjustment, for ease of calibration.

10 Claims, 4 Drawing Figures

4,731,996

POSITION TRANSMITTER FOR A PNEUMATIC-PNEUMATIC OR ELECTRO-PNEUMATIC CONVERTER

FIELD AND BACKGROUND OF THE INVENTION

The present invention relates, in general, to position transmitters and, in particular, to a new and useful position transmitter which can be incorporated in a pneumatic-pneumatic or electro-pneumatic converter, and which readily provides for calibration between a zero position and a maximum position of a device to be actuated by the converter.

Several methods have been utilized in the past for determining the position of an actuated device such as a piston or mechanical drive unit. These methods sensed the position of an element of the actuator device and transmitted this position back to the system controller for controlling the device. One of the more basic methods utilized a variable resistive element, such as a slide wire or potentiometer. This variable resistive element would have a constant voltage applied to it and its slider or wiper would be mechanically linked to the actuator device. By moving the slider, a variable voltage was generated between the wiper and one side of the resistive element. This variable voltage corresponded to the position of the device. The variable voltage was transmitted to the system controller.

A more sophisticated method utilized a so-called LVDT (linear variable differential transformer) or RVDT (rotary variable differential transformer) as the position sensing element. Interface circuitry converted the variable signal of the LVDT or RVDT to a corresponding current signal which was normally a 4–20 mA signal. This signal was transmitted to the system controller.

A potentiometer was also used as a position sensing element with interface circuitry providing the variable current signal. These transmitters were usually not integrally part of the electro-pneumatic or pneumatic-pneumatic positioner used to operate the controller which, in turn, operated the device to be controlled.

SUMMARY OF THE INVENTION

The invention provides a cost-effective, reliable method of sensing and transmitting the position of a device being actuated by an electro-pneumatic or pneumatic-pneumatic converter. The invention also provides a virtually non-interacting zero and span or full scale adjustment, for ease of calibration.

Accordingly, an object of the present invention is to provide a position transmitter for the movable member of an actuator device, comprising a power supply having a pair of terminals with an input line connected to one terminal and an output line connected to the other terminal. Voltage divider means in the form of a potentiometer are connected between the input and the output lines and include a movable contact or wiper which carries a voltage that varies with movement of the contact. The contact is mechanically engaged with the movable member of the device. The device may be a positioning device in a positioner which is coupled to the pneumatic-pneumatic or electro-pneumatic converter. A zero adjust amplifier has an input which is connected to the movable contact for amplifying the voltage carried thereby, and an output which is connected through a series of additional amplifiers and a voltage-to-current converter, to the output line. The zero-adjust amplifier also has an adjustable input. The movable member of the device is moved to its zero or starting position. This simultaneously moves the movable contact to a zero position. Once at this zero position, the adjustable input of the zero adjust amplifier is moved until a low selected signal has been applied to the output line. This is generally a 4 mA signal for a 4–20 mA signal line. A span or full scale adjust amplifier is connected to the output of the zero-adjust amplifier. This amplifier also has an adjustable input, for example, a feedback loop with a potentiometer therein for regulating the feedback signal. The movable member of the device is then moved to its maximum position, thus moving the movable contact to a maximum position and the output signal of the span adjust amplifier is changed, using the adjustable input of this amplifier, to apply a selected high signal to the output line. This is generally a 20 mA signal. A voltage-to-current stage is connected to the output of the span adjust amplifier to convert the variable voltage to a variable current applied to the output line. The voltage-to-current stage is connected across the input and output lines and may be formed by a transistor having a base controlled by an amplifier which amplifies the signal representing a difference between a resistance on the input line and the output of the span adjust amplifier.

Another object of the invention is to incorporate the position transmitter in a controller having a pneumatic-pneumatic or electro-pneumatic converter which actively controls the actuator.

A still further object of the invention is to provide a position transmitter which is simple in design, rugged in construction and economical to manufacture.

For an understanding of the principles of the invention, reference is made to the following description of a typical embodiment thereof as illustrated in the accompanying drawings.

DESCRIPTION OF THE PREFERRED EMBODIMENT

Figure 1:
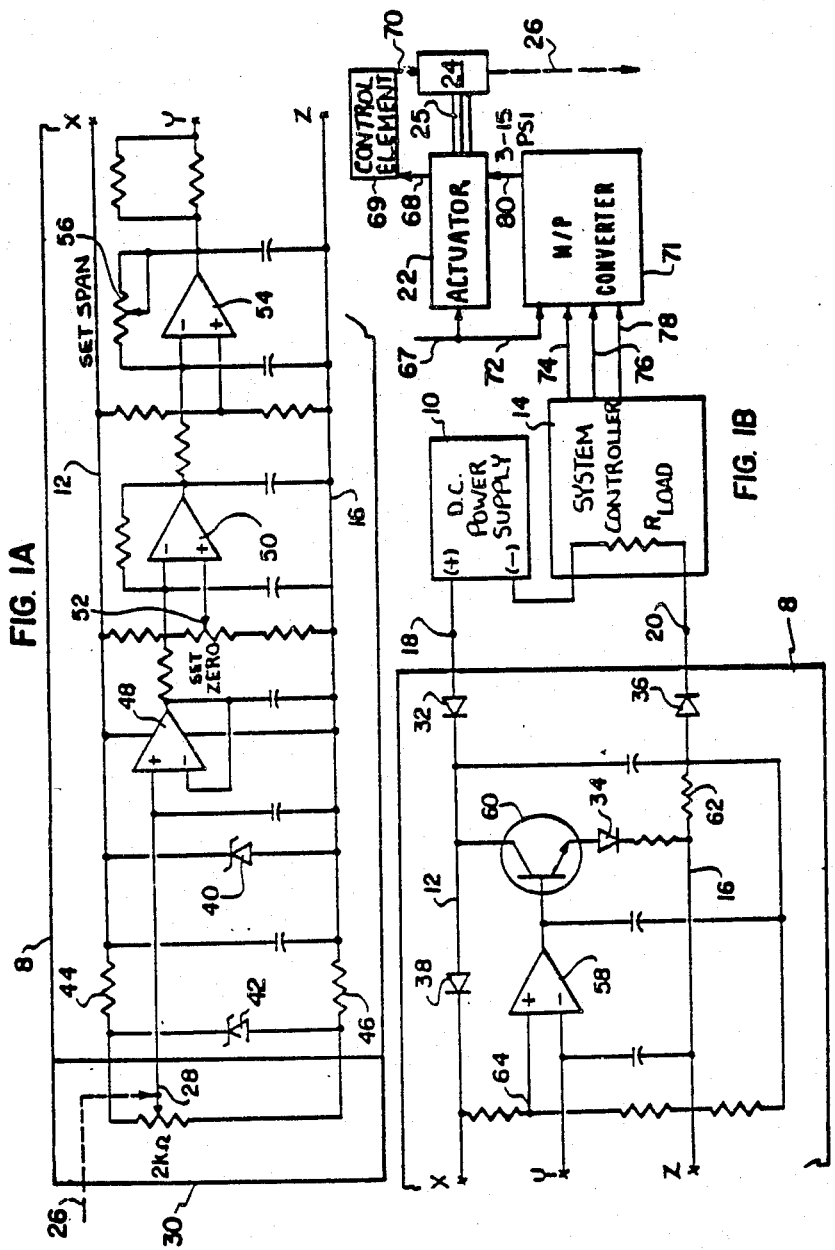
FIGS. 1A and 1B together form a schematic diagram of the position transmitter in accordance with the invention.

Referring to the circuit of FIGS. 1A and 1B, the invention comprises a position transmitter generally designated 8 which utilizes power from a power supply 10. Power supply has a positive terminal connected to an input line 12 and a negative terminal connected, through a system controller 14, to an output line 16. Input line 12 terminates at an input 18 and output line 16 terminates at an output 20.

System controller 14 includes a load resistor shown at $R_{LOAD}$ and controls an actuator 22. Actuator 22 includes a movable member which is schematically shown at 24. The movable member of the actuator device 22 is connected over a mechanical feed-back shaft 25 shown schematically in a box in FIG. 1A. This is mechanically linked over a mechanical linkage 26 to the wiper 28 of a potentiometer 30. Wiper 28, forming a movable contact, thus moves with the movable member of actuator device 22 and forms a mechanical input to the position transmitter.

It is noted that the circuit of FIGS. 1A and 1B is connected at points X, Y and Z.

The input 18 of the transmitter circuitry is at the positive side of the power supply 10. Power supply 10 can provide a voltage range from 12 volts to 42 volts D.C. The selection of the proper power supply voltage is dependent on the load resistor $R_{LOAD}$. This resistor converts the variable current produced at output 20, to a variable voltage. As an example, if the load resistor $R_{LOAD}$ is 600 ohms, the maximum voltage drop across it would be 12 volts D.C. The voltage differential between input 18 and output 20 is conservatively specified to be 12 volts D.C. Adding these voltages together results in a power supply which must provide 24 volts D.C. to the input 18.

The circuit includes signal diodes 32, 34, and 36, which are used to protect against reverse polarity, i.e. accidental reversal of the power supply connections. A current regulator 38, also in the form of a diode, prevents the circuitry from consuming more than 4 mA. This keeps an incorrect current signal from being generated. The power supply for the circuitry is produced by a Zener diode 40 (FIG. 1A) which is nominally 6.4 VDC.

The position sensing element in the form of potentiometer 30 which is mechanically coupled to the mechanical feedback shaft 25 is a 2K ohm potentiometer, for example. A 1.2 V (nominal) Zener diode 42 is placed across the 2K ohm potentiometer 30, that is between the input line 12 and the output line 16. This is to provide immunity against power supply variations effect. Two 2.32 K ohm resistors 44 and 46 are used in the input and output lines respectively as voltage dividers. They also act as current limiters for the 1.2 V Zener diode 42 and the potentiometer 30.

The wiper 28 of the potentiometer 30 is inputted to a buffer amplifier 48 whose variable voltage output goes to a zero-adjust amplifier 50. This zero-adjust amplifier uses a variable offset (or bias) voltage produced by a 50 K ohm potentiometer 52. Potentiometer 52 is connected across the input and output lines and is used to trim the output of the zero adjusting amplifier 50 such that a 4 mA current signal is produced at the output 20. The range of the offset voltage is such that the potentiometer wiper 28 (of the potentiometer 30) can be set at almost any resistive value and a 4 mA signal can still be produced at output 20.

The "zero value" is established by setting the potentiometer wiper 28 at a minimum value which corresponds to a "zero position" of the movable member 24 in the actuator device 22. Once this is done, the potentiometer 52 is adjusted so that the voltage output from the amplifier 50 produces a 4 mA signal on the output 20. Any increase in voltage produced by the potentiometer wiper by moving it in one direction causes a larger current signal to be seen at the output 20. The potentiometer 30 can be assumed to be a rotary potentiometer and the direction of rotation can be clockwise, for example, for increasing the output signal.

The maximum scale or span of the transmitter is set by turning the wiper 28 to its maximum value corresponding to a maximum position for the movable member of the actuator device 22. The output voltage of the zero adjust amplifier is gained up by a span adjust amplifier 54 to produce a 20 mA signal at the output terminal 20. This is done using a 50K ohm potentiometer 56 connected in a feedback loop of the span adjust amplifier 54.

The final stage of the circuit is the voltage-to-current conversion circuitry. This is formed of a driver amplifier 58 which has an input connected to an output of amplifier 54 and an output connected to the base of a transistor 60. The final stage includes a monitoring resistor 62 connected through diode 36 to output terminal 20. The driver amplifier 58 compares the output voltage of the span adjust amplifier 54 to a variable set point voltage at junction 64. This variable set point voltage changes as the current through the monitoring resistor 62 increases or decreases. The output voltage produced by the driver amplifier is just enough to operate the output transistor 60 in the active region. As this output voltage increases, the output transistor is turned on more which allows more collector current to flow. When the output voltage decreases, the transistor begins to turn off, thus allowing less current to be outputted.

Figure 2:
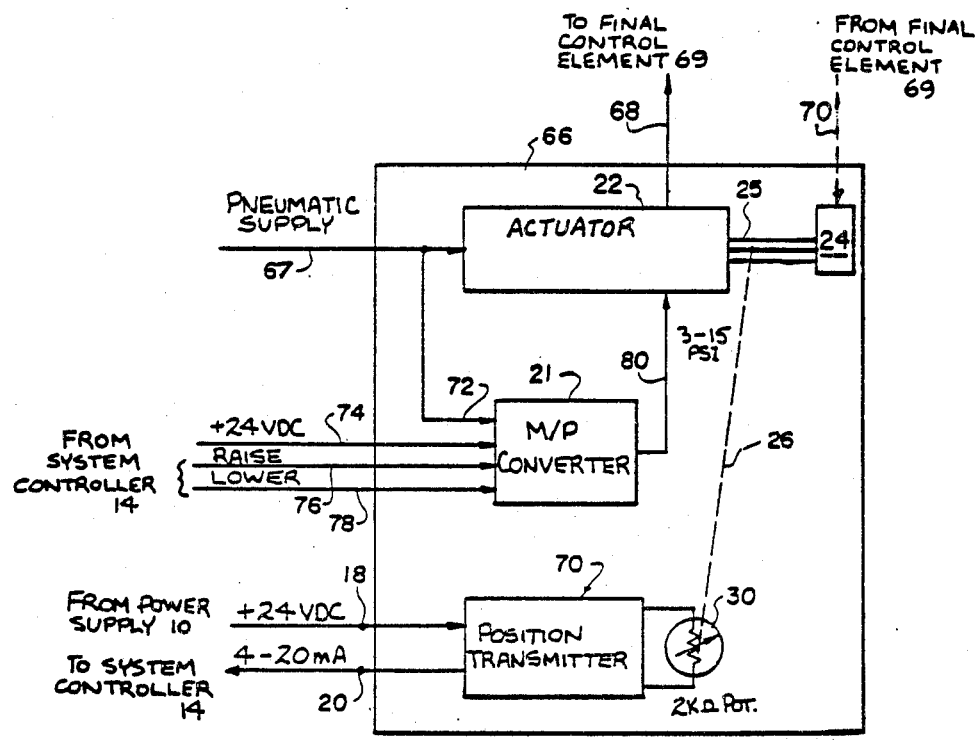
FIG. 2 is a block diagram illustrating a positioner incorporating the position transmitter of the invention.

Referring to FIG. 2, the position transmitter of the present invention is advantageously incorporated in a positioning device generally designated 66 which includes a basic positioner which is, for example, a positioner designated the AP4 pneumatic positioner available from Bailey Controls of Babcock & Wilcox, a McDermott Company. This positioner can be utilized as the actuator 22 and has the mechanical feedback shaft 25 which can be mechanically coupled over gears or other mechanical connections at 26 to the potentiometer 30. The potentiometer 30 is shown connected to the position transmitter whose circuitry is illustrated in FIGS. 1A and 1B.

Actuator 22 is connected to a static supply line 67 for supplying pressurized gas to the actuator and to an output line 68 connected to a final control element 69, such as an air motor, not shown. The control element 69 is mechanically linked over a mechanical linkage 70 to the movable member 24.

The position transmitter 8 has its potentiometer 30 controlled by mechanical linkage 26 and outputs a 4 to 20 mA signal on output terminal 20 to system controller 14. Position transmitter 8 receives power from terminal 18.

An electro-pneumatic converter is shown as the M/P converter 71. The invention can equally be used with a pneumatic-pneumatic converter.

The electro-pneumatic converter 71, also receives pressurized gas over a line 72 connected to the supply line 67, and electrical power over line 74. Converter 71 is connected to a raise line 76 and a lower line 78 which are selectively utilized by the system controller 14 shown in FIG. 1B. In practice a motor is incorporated in converter 71 and rotates in one direction to increase the pressure of gas leaving converter 71 on a line 80 when a signal is applied to the raise line 76. By connecting the lower line 78 to a common terminal, the motor shaft rotates in an opposite direction decreasing the pressure on line 80. The pressure on line 80 is generally between 3 and 15 psi and is proportional to the position of the motor in the converter 71, which in turn is proportional to the electrical signal supplied to the motor.

Figure 3:
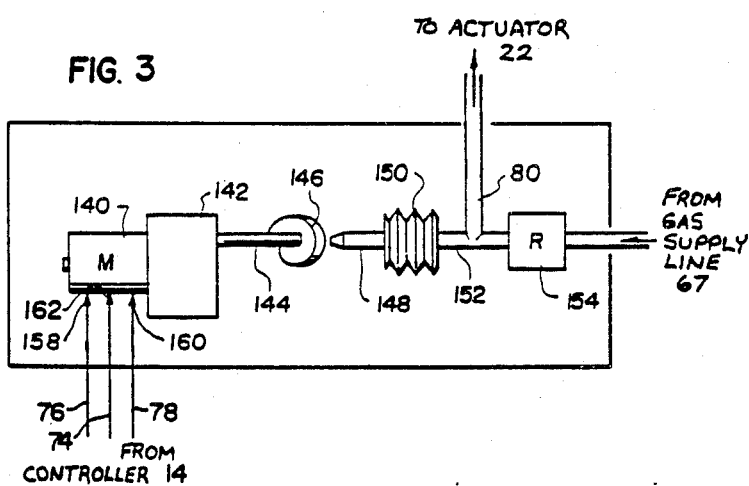
FIG. 3 is a stylized representation of an electro-pneumatic converter which can be used in accordance with the invention.

Referring to FIG. 3, the motor of converter 71 is shown at 140. This can be a reversible DC servomotor. The shaft of motor 140 is connected to a gear assembly 142 which includes an output shaft 144 connected to a cam 146. Cam 146 faces the orifice of a nozzle 148. Nozzle 148 is connected to a spring biased bellows 150 having an input line 152 communicating with the interior of the bellows 150 as well as the interior of the nozzle 148. The line 80 for supplying a pneumatic gas at a control pressure is connected to line 152. Lines 80 and 152 receive gas (generally air) at a constant low pressure of 22 psi ±2 psi from regulator 154. Regulator 154 receives pressurized gas from the gas supply line 67 over line 72.

The rotational position of shaft 144 as controlled by gear unit 142 is ultimately controlled by the shaft of motor 140. The shaft of motor 140 turns in one direction or in an opposite direction at a selected speed which is determined by the electrical power supply to the motor over lines 158, 160, and 162. Terminal 158 is connected to the raise line 76, terminal 160 is connected to the lower line 78, and terminal 162 is connected to the power line 74.

The main advantage of the present invention results from its being integrally incorporated as a portion of an electro-pneumatic or pneumatic-pneumatic converter. The prior art LVDT and RVDT transmitters are devices which must be installed separately. By eliminating the need to install a second device, a cost savings results due to reduced field installation time and also on a lower parts count due to the use of no separate enclosures of mechanical linkages.

Another advantage is that the low power circuitry is simplified in comparison to that needed for LVDT and RVDT devices. Also, the minimal interaction between the zero and span adjustments is an improvement over older potentiometer designs. Thus, less calibration time is required for the present invention.

While a specific embodiment of the invention has been shown and described in detail to illustrate the application of the principles of the invention, it will be understood that the invention may be embodied otherwise without departing from such principles.

What is claimed is:

1. A position transmitter for generating a signal corresponding to the position of a movable member of an actuator device, comprising:
   a DC power supply having a pair of terminals;
   an input line connected to one terminal of said power supply;
   an output line connected to the other terminal of said power supply;
   voltage divider means connected between said input and output lines and having a movable contact mechanically engageable with the movable member of the actuator device for carrying a voltage which varies with motion of the movable member;
   a zero adjust amplifier having an input connected to said movable contact for receiving the voltage carried by said movable contact, and an output, said zero adjust amplifier being connected to influence a current on said output line and having an adjustable input, said movable contact being movable to a zero position corresponding to a zero position of the movable member and said adjustable input being adjusted to apply a low selected current signal to said output line which is indicative of a zero position of the movable member;
   a span adjust amplifier having an input connected to said output of said zero adjust amplifier, said span adjust amplifier having an output and being connected to influence a current on said output line, said span adjust amplifier having an adjustable input, said movable contact being movable to a maximum position corresponding to a maximum position of the movable member and said adjustable input of said span adjust amplifier being adjusted to apply a high selected current signal to said output line which is indicative of the maximum position of the movable member; and
   a voltage-to-current stage connected between said input and output lines and connected to said output of said span adjust amplifier for converting a voltage signal from said span adjust amplifier to a current signal on said output line.

2. A position transmitter according to claim 1, wherein said voltage divider means comprises a potentiometer resistor connected across said input and output lines, said movable contact comprising a wiper engage with said potentiometer resistor, a first resistor connected in said input line and a second resistor connected in said output line.

3. A position transmitter according to claim 2, wherein said DC power supply has a positive terminal connected to said input line and a negative terminal connected to said output line, a first amplifier having a positive input connected to said wiper and an output, said zero adjust amplifier having a negative input connected to said output of said first amplifier, a second potentiometer resistor connected across said input and output lines, a second wiper engaged with said second potentiometer resistor and connected to a positive input of said zero adjust amplifier, said span adjust amplifier having a negative input connected to said output of said zero adjust amplifier and having a negative feeback line having a third potentiometer resistor therein, a third wiper engaged with said third potentiometer resistor and connected to said negative feedback line whereby said zero adjust amplifier has an adjustble input comprising said second potentiometer resistor and wiper and said span adjust amplifier has an adjustable input comprising said third potentiometer resistor and wiper.

4. A position transmitter according to claim 3, wherein said voltage-to-current converter comprises a transistor having an emitter and collector connected across said input and output lines, and a base, a further amplifier having a negative input connected to said output of said span adjust amplifier, and an output connected to said base for controlling the conductivity of said transistor to apply a variable current to said output line with variations in voltage from said span adjust amplifier.

5. A position transmitter according to claim 4, including a first diode connected between said positive terminal of said DC power supply and said input line for conducting current toward said input line and a second diode connected between said output line and said negative terminal of said DC power supply for conducting current toward said negative terminal, and a third diode connected between said transistor and said output line for conducting current from the transistor to the output line, said first, second and third diodes provided for protecting against reverse current in said input and output lines.

6. A position transmitter according to claim 5, including a Zener diode connected between said input and output lines adjacent said first and second resistors for limiting a voltage across said input and output lines.

7. A combination of a position transmitter and a system controller comprising:
a DC power supply having a pair of terminals;
an input line connected to one terminal of said power supply;
an output line connected to the other terminal of said power supply;
voltage divider means connected between said input and output lines and having a movable contact mechanically engageable with the movable member of the actuator device for carrying a voltage which varies with motion of the movable member;
a zero adjust amplifier having an input connected to said movable contact for receiving the voltage carried by said movable contact, and an output, said zero adjust amplifier being connected to influence a current on said output line having an adjustable input, said movable contact being movable to a zero position corresponding to a zero position of the movable member and said adjustable input being adjusted to apply a low selected current signal to said output line which is indicative of a zero position of the movable member;
a span adjust amplifier having an input connected to said output of said zero adjust amplifier, said span adjust amplifier having an output and being connected to influence a current on said output line, said span adjust amplifier having an adjustable input, said movable contact being movable to maximum position corresponding to a maximum position of the movable member and said adjustable input of said span adjust amplifier being adjusted to apply a high selected current signal to said output line which is indicative of the maximum position of the movable member;
a voltage-to-current stage connected between said input and output lines and connected to said output of said span adjust amplifier for converting a voltage signal from said span adjust amplifier to current signal on said output line; and
a system controller having a resistive load connected between said other terminal of said power supply and said output line, said controller connected to a M/P converter for controlling said actuator device.

8. The combination according to claim 7, wherein said M/P converter comprises an electro-pneumatic converter for receiving power from said system controller and having pneumatic means for applying a variable pneumatic signal to the actuator device for controlling the actuator device.

9. A combination of a position transmitter and a system controller comprising:
a DC power supply having a pair of terminals;
an input line connected to one terminal of said power supply;
an output line connected to the other terminal of said power supply;
voltage divider means connected between said input and output lines and having a movable contact mechanically engageable with the movable member of the actuator device for carrying a voltage which varies with motion of the movable member;
a zero adjust amplifier having an input connected to said movable contact for receiving the voltage carried by said movable contact, and an output, said zero adjust amplifier being connected to influence a current on said output line and having an adjustable input, said movable contact being movable to a zero position corresponding to a zero position of the movable member and said adjustable input being adjusted to apply a low selected current signal to said output line which is indicative of a zero position of the movable member;
a span adjust amplifier having an input connected to said output of said zero adjust amplifier, said span adjust amplifier having an output and being connected to influence a current on said output line, said span adjust amplifier having an adjustable input, said movable contact being movable to a maixmum position corresponding to a maximum position of the movable member and said adjustable input of said span adjust amplifier being adjusted to apply a high selected current signal to said output line which is indicative of the maximum position of the movable member;
a voltage-to-current stage connected between said input and output lines and connected to said output of said span adjust amplifier for converting a voltage signal from said span adjust amplifier to a current signal on said output line;
said voltage divider means comprising a potentiometer resistor connected across said input and output lines, said movable contact comprising a wiper engage with said potentiometer resistor, a first resistor connected in said input line and a second resistor connected in said output line;
said DC power supply having a positive terminal connected to said input line and a negative terminal connected to said output line, a first amplifier having a positive input connected to said wiper and an output, said zero adjust amplifier having a negative input connected to said output of said first amplifier, a second potentiometer resistor connected across said input and output lines, a second wiper engaged with said second potentiometer resistor and connected to a positive input of said zero adjust amplifier, said span adjust amplifier having a negative input connected to said output of said zero adjust amplifier and having a negative feedback line having a third potentiometer resistor therein, a third wiper engaged with said third potentiometer resistor and connected to said nagative feedback line whereby said zero adjust amplifier has an adjustable input comprising said second potentiometer resistor and wiper and said span adjust amplifier has an adjustable input comprising said third potentiometer resistor and wiper; and
a system controller having a resistive load connected between said negative terminal of said power supply and said output line, said system controller connected to a M/P converter for controlling said actuator device.

10. A combination of a position transmitter and a system controller comprising:
a DC power supply having a pair of terminals;
an input line connected to one terminal of said power supply;
an output line connected to the other terminal of said power supply;
voltage divider means connected between said input and output lines and having a movable contact mechanically engageable wit the movable member of the actuator device for carrying a voltage which varies with motion of the movable member;

a zero adjust amplifier having an input connected to said movable contact for receiving the voltage carried by said movable contact, and an output, said adjust amplifier being connected to influence a current on said output line and having an adjustable input, said movable contact being movable to a zero position corresponding to a zero position of the movable member and said adjustable input being adjusted to apply a low selected current signal to said output line which is indicative of a zero position of the movable member;

a span adjust amplifier having an input connected to said output of said zero adjust amplifier, said span adjust amplifier having an output and being connected to influence a current on said output line, said span adjust amplifier having an adjustable input, said movable contact being movable to a maximum position corresponding to a maximum position of the movable member and said adjustable input of said span adjust amplifier being adjusted to apply a high selected current signal to said output line which is indicative of the maximum position of the movable member;

a voltage-to-current stage connected between said input and output lines and connected to said output of said span adjust amplifier for converting a voltage signal from said span adjust amplifier to a current signal on said output line;

said voltage divider means comprising a potentiometer resistor connected across said input and output lines, said movable contact comprising a wiper engage with said potentiometer resistor, a first resistor connected in said input line and a second resistor connected in said output line;

said DC power supply having a positive terminal connected to said input line and a negative terminal connected to said output line, a first amplifier having a positive input connected to said wiper and an output, said zero adjust amplifier having a negative input connected to said output of said first amplifier, a second potentiometer resistor connected across said input and output lines, a second wiper engaged with said second potentiometer resistor and connected to a positive input of said zero adjust amplifier, said span adjust amplifer having a negative input connected to said output of said zero adjust amplifier and having a negative feedback line having a third potentiometer resistor therein, a third wiper engaged with said third potentiometer resistor and connected to said negative feedback line whereby said zero adjust amplifier has an adjustable input comprising said second potentiometer resistor and wiper and said span adjust amplifier has an adjustable input comprising said third potentiometer resistor and wiper; and said voltage-to-current converter comprising a transistor having an emitter and collector connected across said input and output lines, and base, a further amplifier having a negative input connected to said output of said span adjust amplifier, and an output connected to said base for controlling the conductivity of said transistor to apply a variable current to said output line with variations in voltage from said span adjust amplifier.

* * * * *